United States Patent
Nakahara

(10) Patent No.: US 10,534,597 B2
(45) Date of Patent: Jan. 14, 2020

(54) INFORMATION PROCESSING APPARATUS THAT PREFORMS SET VALUE SYNCHRONIZATION PROCESS, CONTROL METHOD THEREFOR, STORAGE MEDIUM STORING CONTROL PROGRAM THEREFOR, AND INFORMATION PROCESSING SYSTEM

(71) Applicant: CANON KABUSHIKI KAISHA, Tokyo (JP)

(72) Inventor: Hidetaka Nakahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/190,593

(22) Filed: Jun. 23, 2016

(65) Prior Publication Data
US 2017/0003952 A1 Jan. 5, 2017

(30) Foreign Application Priority Data
Jun. 30, 2015 (JP) .................. 2015-131174

(51) Int. Cl.
*G06F 8/65* (2018.01)
*H04N 1/00* (2006.01)

(52) U.S. Cl.
CPC ........... *G06F 8/65* (2013.01); *H04N 1/00344* (2013.01); *H04N 1/00885* (2013.01); *H04N 1/00933* (2013.01)

(58) Field of Classification Search
CPC .... G06F 3/1225; G06F 3/123; G06F 8/65–68; G06F 3/1232
See application file for complete search history.

(56) References Cited

U.S. PATENT DOCUMENTS

| 7,757,108 B2 * | 7/2010 | Cheshire | G06F 1/3209 713/320 |
| 8,949,644 B2 * | 2/2015 | Ma | G06F 1/00 713/324 |

(Continued)

FOREIGN PATENT DOCUMENTS

JP 2010173318 A 8/2010

OTHER PUBLICATIONS

A. Lampert and S. Koenig, "Configuration management in a heterogeneous target environment," [1988] Proceedings. The Third Israel Conference on Computer Systems and Software Engineering, Tel-Aviv, Israel, 1988, pp. 148-158. Retrieved from https://ieeexplore.ieee.org/abstract/document/72255 on Aug. 29, 2019 (Year: 1988).*

(Continued)

*Primary Examiner* — Geoffrey R St Leger
*Assistant Examiner* — Joanne G Macasiano
(74) *Attorney, Agent, or Firm* — Rossi, Kimms & McDowell LLP

(57) ABSTRACT

An information processing apparatus that is capable of matching setting values among a plurality of devices of which energization states are controllable independently. A receiving unit a request from an information processor, which is provided with a plurality of devices of which energization states are controllable independently and performs an information process according to set data, for update information about set data concerning a device being in an energized state. A determination unit determines whether the set data concerning the requested update information is relevant to set data concerning a device being in a non-energized state. A control unit controls whether the update information about the set data concerning the device being in the energized state is given in a response according (Continued)

to the determination result by the determination unit and to transmit the response to the information processor.

12 Claims, 17 Drawing Sheets

(56) References Cited

U.S. PATENT DOCUMENTS

| | | | |
|---|---|---|---|
| 9,141,370 B1* | 9/2015 | Nay | G06F 8/654 |
| 9,380,518 B2* | 6/2016 | Jung | H04W 48/16 |
| 2004/0243992 A1* | 12/2004 | Gustafson | G06F 8/65 |
| | | | 717/168 |
| 2007/0174601 A1* | 7/2007 | Douglas | G06F 8/65 |
| | | | 713/1 |
| 2009/0195821 A1* | 8/2009 | Matoba | H04N 1/0032 |
| | | | 358/1.15 |
| 2013/0148545 A1* | 6/2013 | Jung | H04W 48/16 |
| | | | 370/255 |
| 2013/0326495 A1* | 12/2013 | Reunamaki | G06F 8/65 |
| | | | 717/173 |
| 2014/0047426 A1* | 2/2014 | Raje | G06F 8/65 |
| | | | 717/168 |
| 2014/0068597 A1* | 3/2014 | Hirahara | G06F 8/65 |
| | | | 717/173 |
| 2014/0146341 A1* | 5/2014 | Goda | G06K 15/4085 |
| | | | 358/1.14 |
| 2016/0182432 A1* | 6/2016 | De | H04L 12/2803 |
| | | | 709/204 |

OTHER PUBLICATIONS

Murta, L. G. P., et al. "Towards Component-based Software Maintenance via Software Configuration Management Techniques." Workshop on Modern Software Maintenance, Brasília, Brazil. 2004. Retrieved from http://citeseerx.ist.psu.edu/viewdoc/download?doi=10.1.1.94.1977&rep=rep1&type=pdf on Aug. 29, 2019 (Year: 2004).*

* cited by examiner

FIG. 8

| KEY IDENTIFIER | DISPLAY TEXT | INITIAL VALUE | DATA LENGTH | RANGE | DISPLAY CHOICE TEXT | DISPLAY CONDITION | SYNC TARGET | MANAGEMENT CONTROLLER | INTERLOCKING KEY IDENTIFIER |
|---|---|---|---|---|---|---|---|---|---|
| device_settings.d001 | ID_D001 | 0 | 2 | 0-1 | 0(ID_OFF)/ 1(ID_ON) | — | LIMITED | INFORMATION PROCESS | printer_settings.p002 |
| device_settings.d002 | ID_D002 | 1 | 2 | 0-1 | 0(ID_OFF)/ 1(ID_ON) | — | LIMITED | INFORMATION PROCESS | scanner_settings.s001 |
| device_settings.d003 | ID_D003 | | 128 | STRING | | A LICENSE | UN-LIMITED | INFORMATION PROCESS | |
| printer_settings.p001 | ID_P001 | 0 | 1 | 0-100 | | — | UN-LIMITED | PRINTER | |
| printer_settings.p002 | — | 0 | 1 | 0-10 | | — | LIMITED | PRINTER | device_settings.d001 |
| scanner_settings.s001 | — | 5 | 1 | 0-5 | | — | LIMITED | SCANNER | device_settings.d002 |

FIG. 9

| ORIGINAL KEY IDENTIFIER | CHANGED VALUE | INTERLOCKING KEY IDENTIFIER | INTERLOCKING VALUE |
|---|---|---|---|
| device_settings.d001 | 0 | printer_settings.p002 | 0 |
| device_settings.d001 | 1 | printer_settings.p002 | 10 |
| device_settings.d002 | 0 | scanner_settings.s001 | 0 |
| device_settings.d002 | 1 | scanner_settings.s001 | 5 |

FIG. 10

| RESOURCE ID | JAPANESE | ENGLISH |
|---|---|---|
| ID_D001 | D1の設定 | D1 Setting |
| ID_D002 | D2の設定 | D2 Setting |
| ID_D003 | D3の設定 | D3 Setting |
| ID_P001 | P1の設定 | P1 Setting |
| ID_ON | ON | On |
| ID_OFF | OFF | Off |

FIG. 11

| KEY IDENTIFIER | VALUE | LAST UPDATE TIME | SYNC TARGET | MANAGEMENT CONTROLLER |
|---|---|---|---|---|
| device_settings.d003 | "ABC" | 2013/6/18/18:00 | UNLIMITED | INFORMATION PROCESS |
| printer_settings.p001 | 100 | 2013/6/18/18:15 | UNLIMITED | PRINTER |

FIG. 12

| KEY IDENTIFIER | VALUE | LAST UPDATE TIME | SYNC TARGET | MANAGEMENT CONTROLLER | NOTIFICATION SUSPENDED STATE |
|---|---|---|---|---|---|
| device_settings.d001 | 0 | 2013/6/17/08:31 | LIMITED | INFORMATION PROCESS | |
| device_settings.d002 | 1 | 2013/6/18/18:55 | LIMITED | INFORMATION PROCESS | O |
| device_settings.d003 | "ABC" | 2013/6/18/18:00 | UN-LIMITED | INFORMATION PROCESS | |
| printer_settings.p001 | 100 | 2013/6/17/12:10 | UN-LIMITED | PRINTER | |
| printer_settings.p002 | 0 | 2013/6/17/08:38 | LIMITED | PRINTER | |
| scanner_settings.s001 | 5 | 2013/6/18/18:56 | LIMITED | SCANNER | O |

| ATTRIBUTE | VALUE |
|---|---|
| INDIVIDUAL IDENTIFIER | INDIVIDUAL 1 |
| MODEL NAME | MODEL A |
| INSTALLED LICENSE | A LICENSE |
| ACCESSARY | Finisher-X |

FIG. 16

| KEY IDENTIFIER | CURRENT VALUE | INITIAL VALUE | DATA LENGTH | RANGE |
|---|---|---|---|---|
| device_settings.d001 | 0 | 0 | 2 | 0-1 |
| device_settings.d002 | 1 | 1 | 2 | 0-1 |
| device_settings.d003 | ABC | NULL | 128 | STRING |

FIG. 17

| KEY IDENTIFIER | CURRENT VALUE | INITIAL VALUE | DATA LENGTH | RANGE |
|---|---|---|---|---|
| printer_settings.p001 | 0 | 0 | 1 | 0-100 |
| printer_settings.p002 | 0 | 0 | 1 | 0-10 |

FIG. 18

| KEY IDENTIFIER | CURRENT VALUE | INITIAL VALUE | DATA LENGTH | RANGE |
|---|---|---|---|---|
| scanner_settings.s001 | 5 | 5 | 1 | 0-5 |

FIG. 19

| CONTROLLER | POWER STATE |
|---|---|
| INFORMATION PROCESS | ENERGIZED |
| PRINTER | NON-ENERGIZED |
| SCANNER | NON-ENERGIZED |

FIG. 20

| CONTROLLER | LAST UPDATE TIME |
|---|---|
| INFORMATION PROCESS | 2013/6/18/17:13 |
| PRINTER | 2013/6/18/18:43 |
| SCANNER | 2013/6/18/18:43 |

FIG. 24

```
<?xml version="1.0" encoding="utf-8"?>
<device_data xmlns="http://www.conon.com/device_data">
    <xml_information>
        <version>1.00</version>
    </xml_information>
    <X-time-server>201306181713</X-time-server>
    <device_settings.d003>0</device_settings.d001>
    <printer_setings.p001>0</printer_setings.p001>
</device_data>
```

INFORMATION PROCESSING APPARATUS THAT PREFORMS SET VALUE SYNCHRONIZATION PROCESS, CONTROL METHOD THEREFOR, STORAGE MEDIUM STORING CONTROL PROGRAM THEREFOR, AND INFORMATION PROCESSING SYSTEM

BACKGROUND OF THE INVENTION

Field of the Invention

The present invention relates to an information processing apparatus, a control method therefor, a storage medium storing a control program therefor, and an information processing system, and in particular, relates to the information processing apparatus that performs a set-value synchronization process for synchronizing a set value saved in an information processor with a set value saved in another information processor.

Description of the Related Art

There is a known method that saves master data of various kinds of set values saved in an information processor like a multifunctional peripheral device (an image processing apparatus) in an information processing apparatus like a server and unitarily manages the master data. The set values saved in the multifunctional peripheral device need to be synchronized with the master data saved in the server. Accordingly, when the master data saved in the server is changed, the server notifies the multifunctional peripheral device of the post-changing set values, and the set values saved in the multifunctional peripheral device are changed. In the same manner, when the set values saved in the multifunctional peripheral device are changed, the master data saved in the server is also changed.

Furthermore, a system that synchronizes setting values saved in a multifunctional peripheral device with master data saved in a server is disclosed in Japanese Laid-Open Patent Publication (Kokai) No. 2010-173318 (JP 2010-173318A), for example.

The image forming apparatus disclosed in this publication is provided with a plurality of devices of which energization states are controllable independently. When synchronizing data is received from the server and when a device that the synchronizing data should be reflected is in a non-energized state for saving power, update using the synchronizing data is suspended until the device concerned shifts to an energized state.

Incidentally, when an information processor like a multifunctional peripheral device that is provided with a plurality of devices (for example, controller) performs an update process corresponding to synchronizing data received from a server, timings of the update process are different between a device in an energized state and a device in a non-energized state. That is, although the update process is promptly performed for the device in the energized state, the update process will be performed after shifting to the energized state for the device in the non-energized state.

Furthermore, even if setting values are mutually dependent among a plurality of devices, the update process will be performed only for the device in the energized state. In this case, it is preferable to perform the update process according to the dependent setting values promptly for the device in the non-energized state after shifting to the energized state.

However, when the master data of the setting values is managed on a network, the dependent setting values may not be received from the server promptly after the device in the non-energized state shifts to the energized state. In such a case, even if a plurality of devices that use the setting values that are mutually dependent are in the energized state, the setting values are different one another.

SUMMARY OF THE INVENTION

The present invention provides an information processing apparatus, a control method therefor, a storage medium storing a control program therefor, and an information processing system, which are capable of matching setting values among a plurality of devices of which energization states are controllable independently.

Accordingly, a first aspect of the present invention provides an information processing apparatus including a receiving unit configured to receive a request from an information processor, which is provided with a plurality of devices of which energization states are controllable independently and performs an information process according to set data, for update information about set data concerning a device being in an energized state, a determination unit configured to determine whether the set data concerning the requested update information is relevant to set data concerning a device being in a non-energized state, and a control unit configured to control whether the update information about the set data concerning the device being in the energized state is given in a response according to the determination result by the determination unit and to transmit the response to the information processor.

Accordingly, a second aspect of the present invention provides an information processing system including an information processor that is provided with a plurality of devices of which energization states are controllable independently and a transmission unit configured to transmit a request for update information about set data concerning a device being in an energized state, and that performs an information process according to the set data, and an information processing apparatus that sends a response to the request for the update information about the set data to the information processor. The information processing apparatus includes a determination unit configured to determine whether the set data concerning the requested update information is relevant to set data concerning a device being in a non-energized state, and a control unit configured to control whether the update information about the set data concerning the device being in the energized state is given in the response according to the determination result by the determination unit and to transmit the response to the information processor.

Accordingly, a third aspect of the present invention provides a control method for an information processing apparatus, the control method including a receiving step of receiving a request from an information processor, which is provided with a plurality of devices of which energization states are controllable independently and performs an information process according to set data, for update information about set data concerning a device being in an energized state, a determination step of determining whether the set data concerning the requested update information is relevant to set data concerning a device being in a non-energized state, and a control step of controlling whether the update information about the set data concerning the device being in the energized state is given in the response according to the determination result by the determination unit and to transmit the response to the information processor.

Accordingly, a fourth aspect of the present invention provides a non-transitory computer-readable storage medium storing a control program causing a computer to execute the control method of the third aspect.

According to the present invention, the set values are matched among a plurality of devices of which energization states are controllable independently in an information processor like a multifunctional peripheral device.

Further features of the present invention will become apparent from the following description of exemplary embodiments with reference to the attached drawings.

BRIEF DESCRIPTION OF THE DRAWINGS

FIG. 8 is a view showing an example of data stored in a specification management DB (database) shown in FIG. 7.

FIG. 9 is a view showing an example of data stored in the specification management DB shown in FIG. 7.

FIG. 10 is a view showing an example of data stored in a display resource DB shown in FIG. 7.

FIG. 11 is a view showing an example of data stored in a common set value DB shown in FIG. 7.

FIG. 12 is a view showing an example of data stored in an individual set value DB shown in FIG. 7.

FIG. 16 is a view showing an example of data stored in an information-process-set-value DB shown in FIG. 15.

FIG. 17 is a view showing an example of data stored in a printer-set-value DB shown in FIG. 15.

FIG. 18 is a view showing an example of data stored in a scanner-set-value DB shown in FIG. 15.

FIG. 19 is a view showing examples of power supply state of controllers managed by a power supply management module shown in FIG. 15.

FIG. 20 is a view showing an example of data stored in a last synchronization time DB shown in FIG. 15.

FIG. 24 is a view showing an example of the response data generated by a set-data management module shown in FIG. 14.

DESCRIPTION OF THE EMBODIMENTS

Hereafter, embodiments according to the present invention will be described in detail with reference to the drawings.

Figure 1:
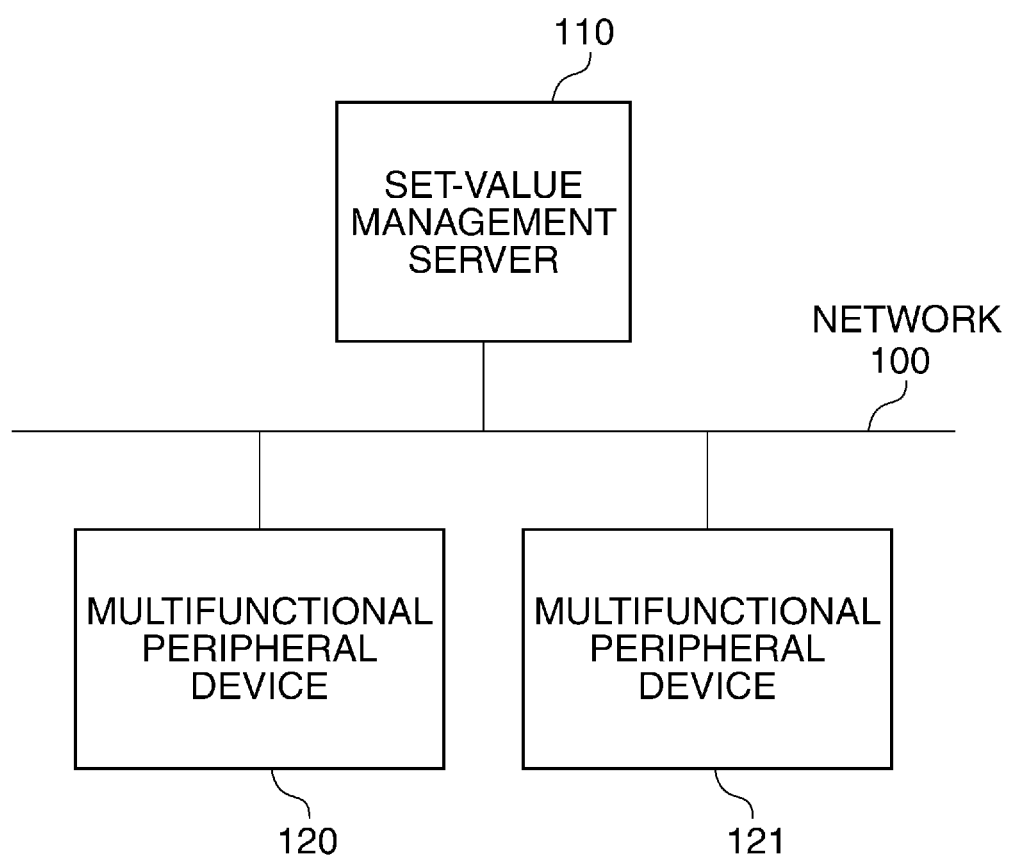
FIG. 1 is a block diagram schematically showing an example of an information processing system with an information processing apparatus according to a first embodiment of the present invention.

FIG. 1 is a block diagram schematically showing an example of an information processing system with an information processing apparatus according to a first embodiment of the present invention.

In the illustrated information processing system, a set-value management server (hereinafter referred to as a server) 110 is used as an example of an information processing apparatus. The server 110 and a multifunctional peripheral devices (information processors) 120 and 121 are connected to a network 100. Although the multifunctional peripheral devices 120 and 121 are connected to the network 100 in the illustrated example, it is enough to connect at least one multifunctional peripheral device to the network 100.

The server 110 manages a master data of set values (setting data) set in the multifunctional peripheral device 120 and the multifunctional peripheral device 121.

Each of the multifunctional peripheral devices 120 and 121 has a plurality of kinds of functions. For example, each of the multifunctional peripheral devices 120 and 121 has a copy function, a facsimile function, and the like. Each of the multifunctional peripheral devices 120 and 121 saves set values used when these functions are performed.

Each of the multifunctional peripheral devices 120 and 121 notifies the server 110 of set-value update information (i.e., change data showing changed contents) through the network 100, when a saved set value is changed. When receiving the set-value update information from the multifunctional peripheral device 120 or 121, the server 110 changes the master data according to the set-value update information concerned. On the other hand, when the master data is changed, the server 110 notifies the multifunctional peripheral device 120 and the multifunctional peripheral device 121 of the set-value update information through the network 100. When receiving the set-value update information showing that the master data has been changed from the server 110, each of the multifunctional peripheral devices 120 and 121 changes the set values on the basis of the set-value update information.

Some types of set values may be synchronized between the multifunctional peripheral device 120 and the multifunctional peripheral device 121. In such a case, when the master data saved in the server 110 is changed, the server 110 notifies both the multifunctional peripheral devices 120 and 121 of the set-value update information. Furthermore, when a set value is changed in either of the multifunctional peripheral devices 120 and 121, the multifunctional peripheral device in which the set value is changed notifies the server 110 of the set-value update information first. Then, the server 110 notifies the other multifunctional peripheral device of the set-value update information.

Figure 2:
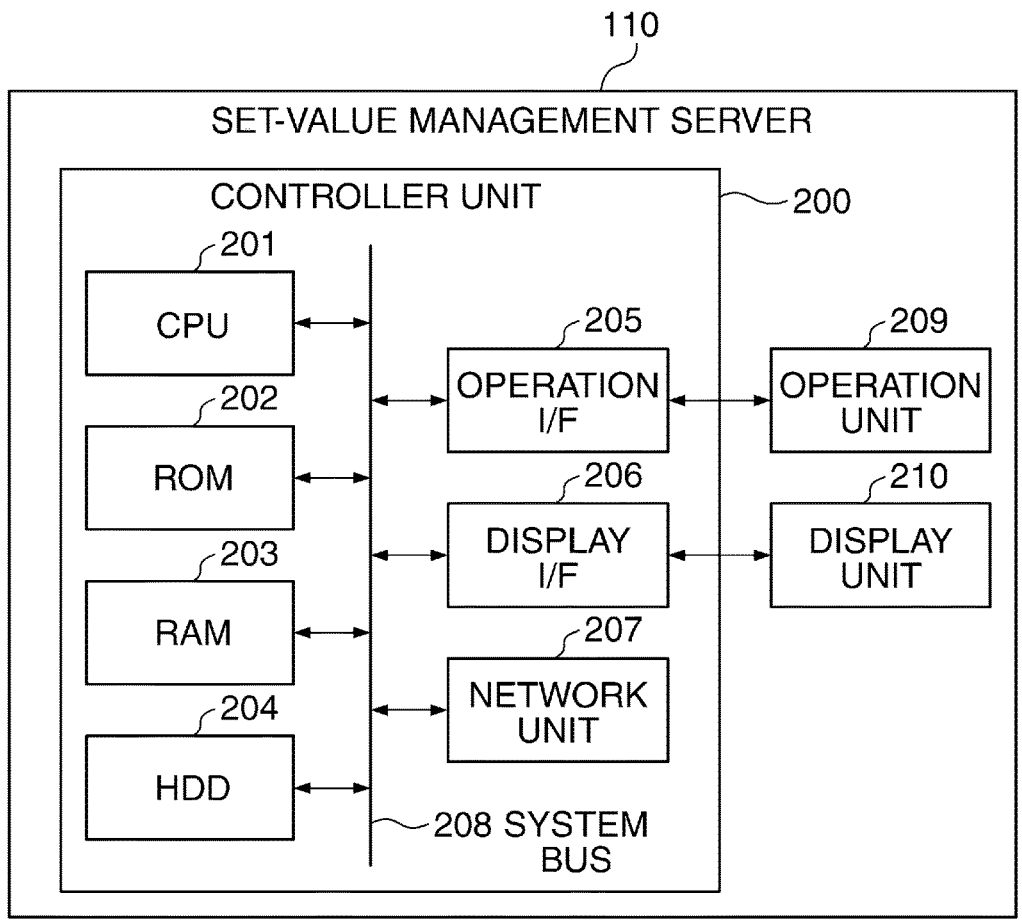
FIG. 2 is a block diagram schematically showing an example of a configuration of a server shown in FIG. 1.

FIG. 2 is a block diagram schematically showing an example of a configuration of the server 110 shown in FIG. 1.

The server 110 has a controller unit 200, an operation unit 209, and a display unit 210. Then, the controller unit 200 is provided with a CPU (Central Processing Unit) 201.

The CPU 201 starts an OS (Operating System) with a boot program stored in a ROM (Read Only Memory) 202. The CPU 201 runs an application program (AP) stored in an HDD (Hard Disk Drive) 204 on the OS, and performs various processes. A RAM (Random Access Memory) 203 is used as a workspace of the CPU 201.

The HDD 204 stores the AP, master data about the set values set in the multifunctional peripheral devices 120 and 121, and the like. It should be noted that a management method for the master data will be mentioned later.

The ROM 202 and the RAM 203 are connected to the CPU 201 through a system bus 208. An operation I/F 205, display I/F 206, and network unit 207 are also connected to the CPU 201. The operation I/F 205 is an interface with the operation unit 209. The operation unit 209 has a pointing device (for example, a mouse) and a keyboard. The operation I/F 205 sends instructions input by a user using the operation unit 209 to the CPU 201.

The display unit 210 has a display unit. The display I/F 206 sends image data that should be displayed on the display unit 210 to the display unit 210, for example. Moreover, the network unit 207 is connected to the network 100, and transmits and receives information with apparatuses on the network 100 through the network 100.

Figure 3:
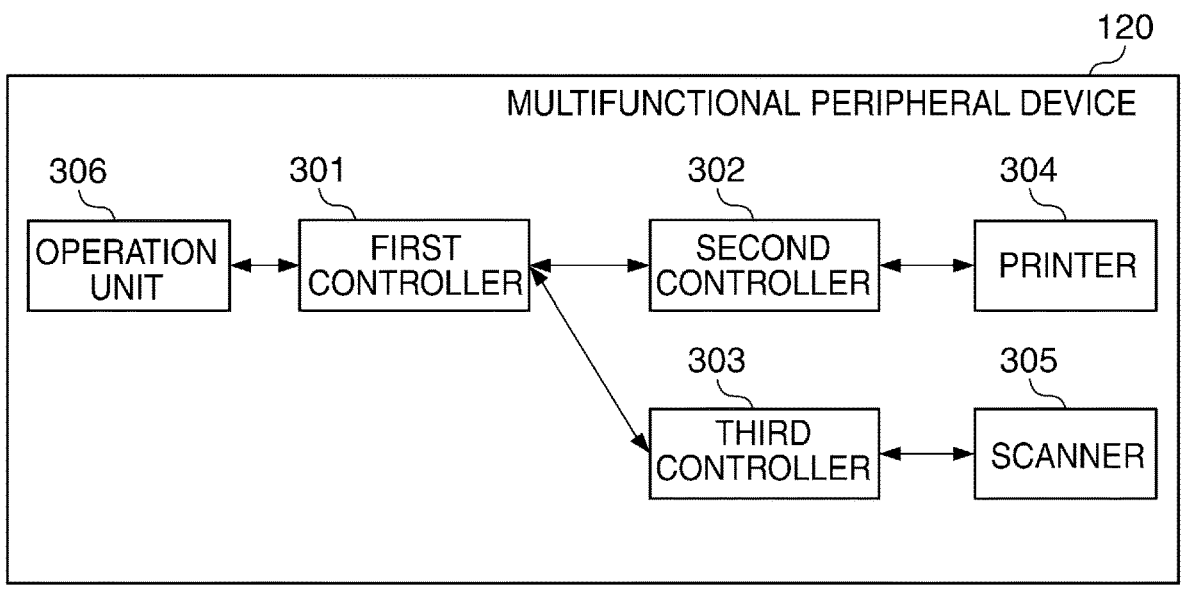
FIG. 3 is a block diagram schematically showing an example of a configuration of a multifunctional peripheral device shown in FIG. 1.

FIG. 3 is a block diagram schematically showing an example of a configuration of the multifunctional peripheral device 120 shown in FIG. 1. Since the configurations of the multifunctional peripheral devices 120 and 121 are identical, the configuration of the multifunctional peripheral device 120 will be focused and described in the following description.

The multifunctional peripheral device 120 is provided with a first controller 301, second controller 302, third controller 303, printer 304, scanner 305, and operation unit 306. The first controller 301 presides over information processing control (for example, image processing control) that is performed with the multifunctional peripheral device 120.

The first controller 301 is connected to the operation unit 306, second controller 302, and third controller 302. The first controller 301 is an information-processing controller unit that controls the second controller and the third controller in this embodiment. Then, the second controller 302 controls the printer 304 that is an image output device. Moreover, the third controller 303 controls the scanner 305 that is an image input device.

Figure 4:
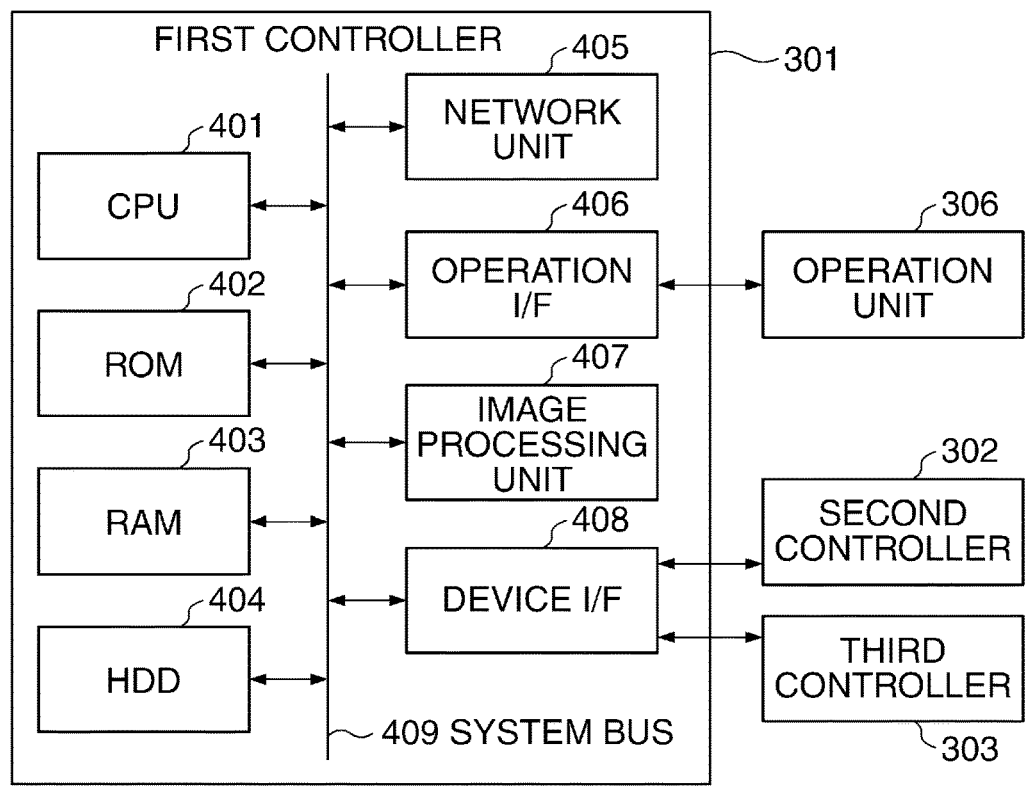
FIG. 4 is a block diagram schematically showing an example of a configuration of a first controller shown in FIG. 3.

FIG. 4 is a block diagram schematically showing an example of a configuration of the first controller 301 shown in FIG. 3.

The first controller 301 has a CPU 401. The CPU 401 starts an OS by a boot program stored in a ROM 402. The CPU 401 performs an AP stored in an HDD 404 on the OS, and performs various processes. A RAM 403 is used as a workspace of the CPU 401. Moreover, the RAM 403 is used as an image memory area for storing image data temporarily.

The HDD 404 stores the AP, image data and various programs. It should be noted that a management method of the set values in the multifunctional peripheral devices 120 and 121 will be mentioned later.

The ROM 402 and RAM 403 are connected to the CPU 401 through a system bus 409. An operation I/F 406, device I/F 408, and network unit 407 are also connected to the CPU 201.

A touch panel is arranged on a display screen of the operation unit 306. The operation I/F 406 is an interface with the operation unit 306, and outputs the image data that should be displayed on the operation unit 306 to the operation unit 306. The operation I/F 406 sends instructions input by a user using the operation unit 306 to the CPU 401.

The second controller 302 and the third controller 303 are connected to the device I/F 408. The device I/F 408 converts the image data between a synchronous system and an asynchronous system. The network unit 405 is connected to the network 100, and transmits and receives information with apparatuses on the network 100 through the network 100.

The image processing unit 407 applies an output image process to the image data output to the printer 304. Furthermore, the image processing unit 407 applies an input image process, image rotation process, image compression process, definition conversion process, color space conversion process, gray scale conversion process, etc. to the image input from the scanner 305.

Figure 5:
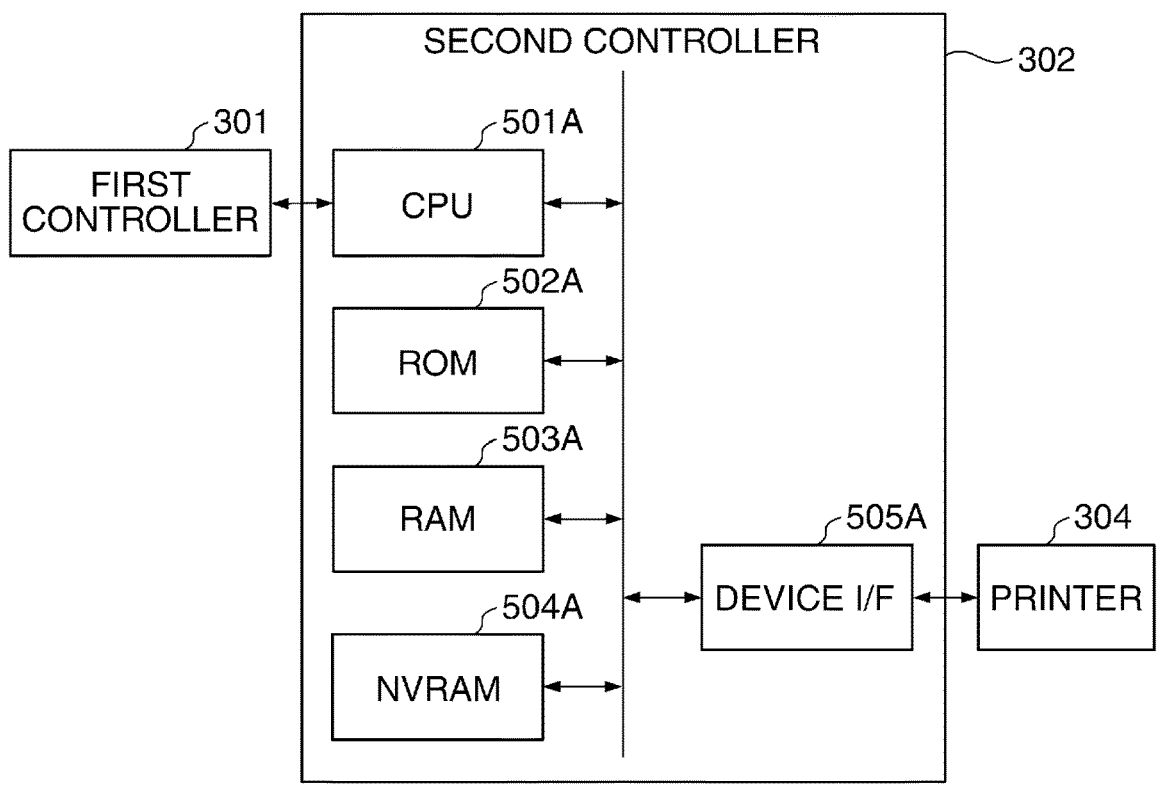
FIG. 5 is a block diagram schematically showing an example of a configuration of a second controller shown in FIG. 3.

FIG. 5 is a block diagram schematically showing an example of a configuration of the second controller 302 shown in FIG. 3.

The second controller 302 has a CPU 501A. The CPU 501A starts an OS by a boot program stored in a ROM 502A. The CPU 501A performs an AP stored in an NVRAM (nonvolatile memory) 504A on the OS, and performs various processes. A RAM 503A is used as a workspace of the CPU 501A. Moreover, the RAM 503A is used as an image memory area for storing image data temporarily.

The NVRAM 504A stores the AP, image data and various set values. It should be noted that an HDD or an SRAM may be used instead of the NVRAM 504A, for example. A device I/F 505A is an interface between the second controller 302 and the printer 304.

Figure 6:
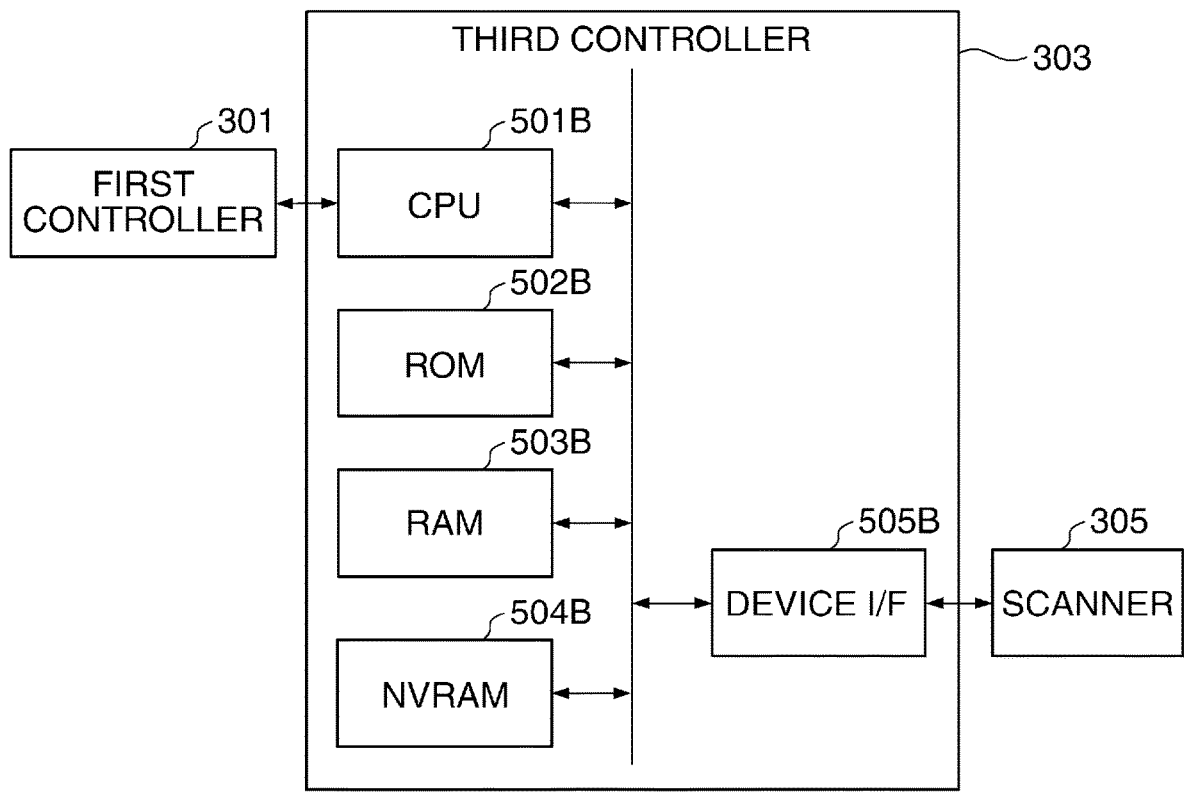
FIG. 6 is a block diagram schematically showing an example of a configuration of a third controller shown in FIG. 3.

FIG. 6 is a block diagram schematically showing an example of a configuration of the third controller 303 shown in FIG. 3.

The third controller 303 has a CPU 501B. The CPU 501B starts an OS by a boot program stored in a ROM 502B. The CPU 501B performs an AP stored in an NVRAM 504B on the OS, and performs various processes. A RAM 503B is used as a workspace of the CPU 501B. Moreover, the RAM 503B is used as an image memory area for storing image data temporarily.

The NVRAM 504B stores the AP, image data and various programs. It should be noted that an HDD or an SRAM may be used instead of the NVRAM 504B, for example. A device I/F 505B is an interface between the third controller 303 and the scanner 305.

Figure 7:
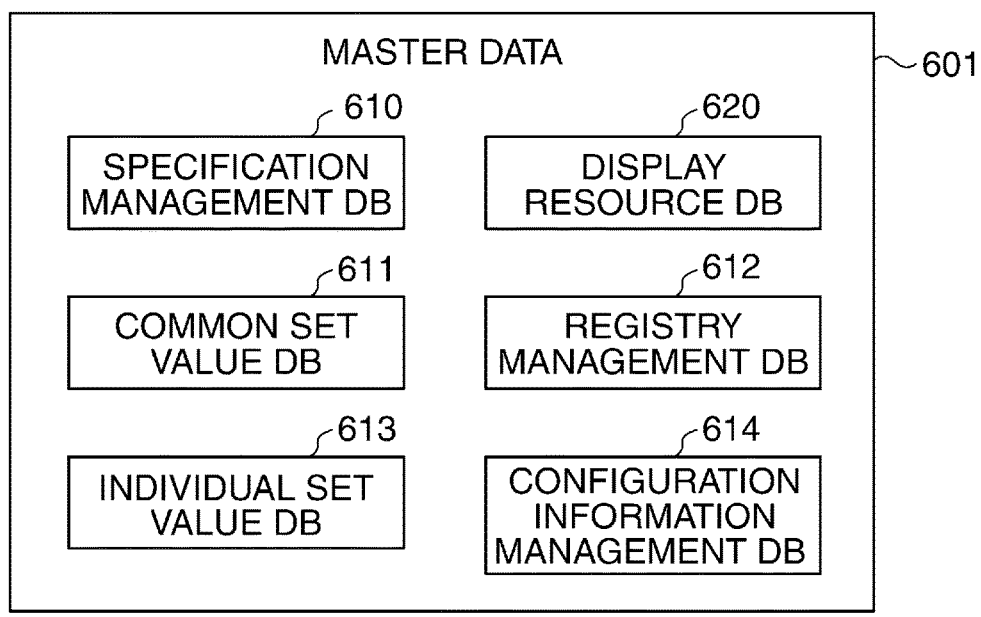
FIG. 7 is a view showing an example of a configuration of master data managed by the server shown in FIG. 2.

FIG. 7 is a view showing an example of a configuration of master data managed by the server 110 shown in FIG. 2.

The master data 601 is provided with a specification management DB 610, common set value DB 611, registry management DB 612, individual set value DB 613, configuration information management DB 614, and display resource DB 620.

FIG. 8 and FIG. 9 are views showing examples of data stored in the specification management DB 610 shown in FIG. 7.

The specification management DB 610 stores a text (a display choice text) that is suggested to a user, a key identifier (an item) for identifying a set value at the time of communication with the multifunctional peripheral device 120 or 121, display text information, an initial value, a data length, a range, and a display condition of a set value, as metadata about the set values managed by the server 110. Furthermore, the specification management DB 610 manages information that shows a type of the multifunctional peripheral device that is a synchronization (sync) target of a set value.

The information that shows a target of synchronization includes two items of "UNLIMITED" and "LIMITED". The information of "UNLIMITED" means that the set value concerned is common to all the other multifunctional peripheral devices. Moreover, the information of "LIMITED" means that the set value is able to be synchronized only among multifunctional peripheral devices of the same type.

Moreover, the specification management DB 610 stores management controller information that specifies a controller that manages the set value. In the illustrated example, there are three management controllers of "INFORMATION PROCESS", "PRINTER", and "SCANNER". Then, "INFORMATION PROCESS", "PRINTER", and "SCANNER" respectively show that the set values are managed by the first controller 301, the second controller 302, and the third controller 303.

In addition, the specification management DB 610 stores an interlocking key identifier corresponding to the key identifier. For example, since the key identifier "device_settings.d001" relates to the interlocking key identifier "printer_settings.p002", the set values are needed to change by interlocking.

FIG. 9 is a table showing an interlocking specification between a key identifier and an interlocking key identifier. That is, the table used to manage relationships between the set values and the devices. As shown in FIG. 9, when the value (changed value) of the key identifier "device_settings.d001" is changed to "0", the value (interlocking value) of the interlocking key identifier "printer_settings.p002" is changed to "0" by interlocking. Moreover, when the value of the key identifier "device_settings.d001" is changed to "1", the value of the interlocking key identifier "printer_settings.p002" is changed to "10" by interlocking.

FIG. 10 is a view showing an example of data stored in the display resource DB 620 shown in FIG. 7.

As shown in FIG. 10, the display text information linked to a resource ID is stored for every language. Although only Japanese and English are described as examples, texts in other languages may be stored.

FIG. 11 is a view showing an example of data stored in the common set value DB 611 shown in FIG. 7.

The illustrated common set value DB 611 manages the set values by sharing and synchronizing among all the multifunctional peripheral devices 120 and 121 of which the set values are managed by the server 110. The common set value DB 611 stores the key identifier, the value corresponding to the key identifier, the last update time for the set value, the synchronization target information, and the management controller information. This key identifier has the same system as the key identifier in the specification management DB 610.

FIG. 12 is a view showing an example of data stored in the individual set value DB 613 shown in FIG. 7.

The individual set value DB 613 manages the set values that are individually different between the plurality of multifunctional peripheral devices 120 and 121 of which the set values are managed by the server 110. It should be noted that the individual set value DB 613 shall be given to every multifunctional peripheral device (there are two individual set value DBs in this example).

The individual set value DB 613 stores the key identifier, the value corresponding to the key identifier, the last update date of the set value, the synchronization target information, and the management controller information. This key identifier has the same system as the key identifier in the specification management DB 610. Moreover, the set value of which the synchronization target information is "LIMITED" shall be stored only in the individual set value DB 613.

Since the individual set value DB 613 stores the master data of the set values saved in the multifunctional peripheral devices 120 and 121, the records that are copies of the data managed by common set value DB 611 are also stored. Furthermore, the individual set value DB 613 stores a flag showing a notification suspended state, and the flag is used for synchronization control.

Figures 13, 14:
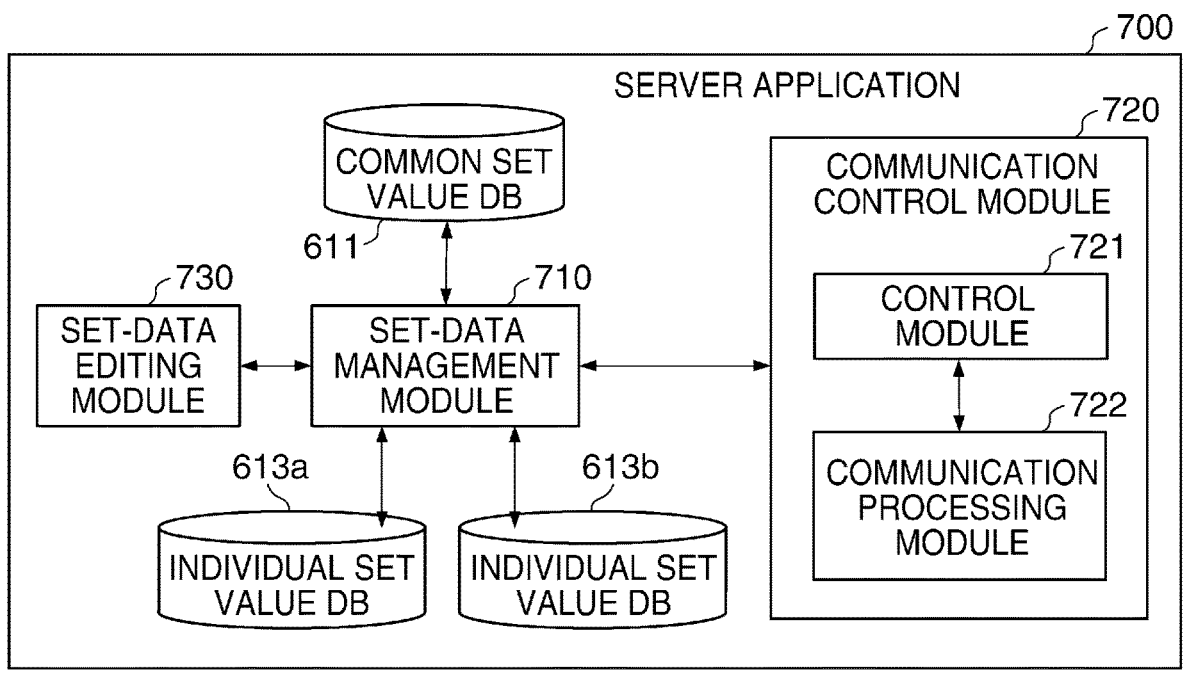
FIG. 13 is a view showing an example of device configuration information about each individual multifunctional peripheral device managed in a configuration information management DB shown in FIG. 7.
FIG. 14 is a view for describing functions of a server application that runs on the server shown in FIG. 2.

FIG. 13 is a view showing an example of the device configuration information about each individual multifunctional peripheral device managed in the configuration information management DB 614 shown in FIG. 7.

The configuration information management DB 614 stores and manages a plurality of pieces of the device configuration information. The device configuration information has an individual identifier for identifying an individual multifunctional peripheral device and a model name. Furthermore, the device configuration information has license information (an installed license) showing available functions and accessory information showing available accessories. It should be noted that the model name, the license information, and the like have the same system as the information stored in the specification management DB 610.

The registry management DB 612 manages the individual identifier of an individual multifunctional peripheral device of which the set values are managed by the server 110.

The server 110 collectively manages the set values that are individually different between the plurality of managed multifunctional peripheral devices, the set values that are common among all the managed multifunctional peripheral devices, and the metadata of the set values, using the databases in the master data 601 mentioned above.

FIG. 14 is a view for describing functions of a server application that runs on the server 110 shown in FIG. 2.

The server application (hereinafter referred to as a server AP) 700 is stored in the RAM 203, the HDD 204, or the ROM 202 shown in FIG. 2, and is performed by the CPU 201. The server AP 700 has a set-data management module 710 and a communication control module 720.

The set-data management module 710 manages the above-mentioned common set value DB 611 and individual set value DB 613 among the master data 601 saved in the server 110. It should be noted that the number of the individual set value DBs 613 is equal to the number of the multifunctional peripheral devices of which the set values are synchronized with the server 110. In the information processing system shown in FIG. 1, the multifunctional peripheral devices 120 and 121 are subjected to management by the server 110. Accordingly, the set-data management module 710 manages the individual set value DBs 613a and 613b corresponding to the multifunctional peripheral devices 120 and 121.

The common set value DB 611 and the individual set value DBs 613a and 613b that are managed by the set-data management module 710 are saved in the HDD 204, the RAM 203, or the ROM 202.

The communication control module 720 is provided with a control module 721 that controls a set-value synchronization process with the multifunctional peripheral device and a communication processing module 722 that performs communication process through the network unit 207. It should be noted that processes performed by these control module 721 and communication processing module 722 will be mentioned later.

When the communication control module 720 receives the set-value update information from the multifunctional peripheral device, the set-data management module 710 reflects the set-value update information concerned to the common set value DB 611 and individual set value DBs 613a and 613b, which are managed by the server 110. Moreover, when the communication control module 720 receives a set-value-update-information request from the multifunctional peripheral device, the set-data management module 710 generates set-value update information that should be transmitted to the multifunctional peripheral device. Then, the set-data management module 710 notifies the communication control module 720 of the set-value update information concerned.

The communication control module 720 controls a set-value synchronization communication with the multifunctional peripheral device. For example, when the communication processing module 722 receives the set-value update information from the multifunctional peripheral device, the control module 721 notifies the set-data management module 710 of the set-value update information concerned. Moreover, when the communication processing module 722 receives a set-value-update-information request from the multifunctional peripheral device, the control module 721 obtains the set-value update information about the multifunctional peripheral device from the set-data management module 710. Then, the control module 721 instructs the communication processing module 722 to transmit the set-value update information concerned to the multifunctional peripheral device. As a result of this, the communication processing module 722 communicates with the multifunctional peripheral device.

A set-data editing module 730 has a communication function that enables to read and edit a set value through the network 100. The set-data editing module 730 has a function for accessing with a web browser used in a PC or tablet.

The set-data editing module 730 uses data stored in the specification management DB 610 in order to display a set-value editing screen on a browser user interface (UI) and to edit. When receiving the instruction through the browser UI, the set-data management module 710 is able to read and write data stored in the DBs.

Figure 15:
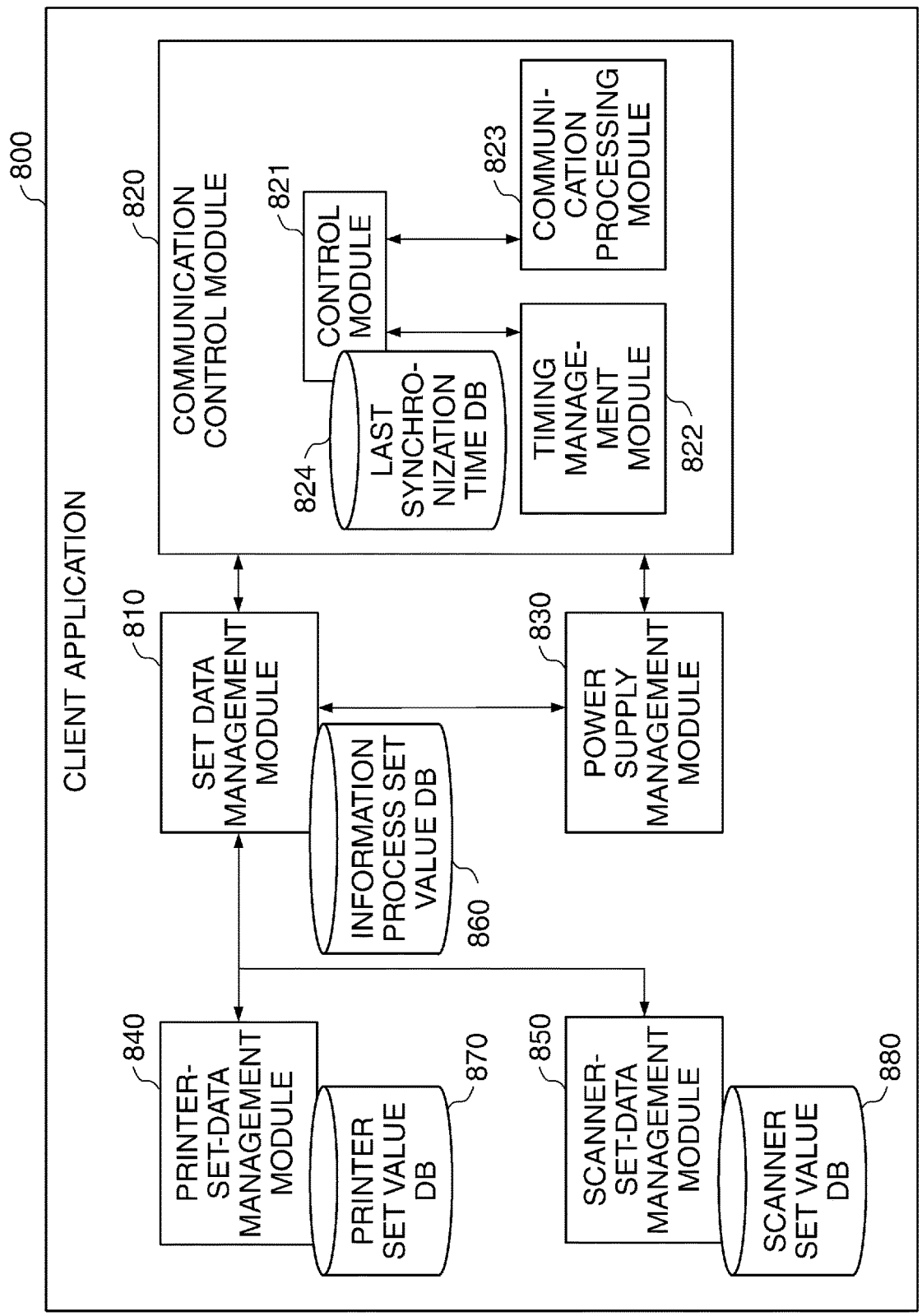
FIG. 15 is a view for describing functions of a client application that runs on the multifunctional peripheral device shown in FIG. 3.

FIG. 15 is a view for describing functions of a client application that runs on the multifunctional peripheral device shown in FIG. 3.

The client application (hereinafter referred to as a client AP) 800 is stored in the RAM 403, HDD 404, or ROM 402 of the first controller 301 and is performed by the CPU 401, for example.

The client AP 800 has a set-data management module 810 and a communication control module 820. The set-data management module 810 presides over management of set values saved in the multifunctional peripheral device, and manages the set values saved in the information-process-set-value DB 860.

FIG. 16 is a view showing an example of data stored in the information-process-set-value DB 860 shown in FIG. 15.

The information-process-set-value DB 860 stores a key identifier for identifying a set value, and a current value, initial value, data length, and range of the set value. In particular, the information-process-set-value DB 860 stores the set value of which the management controller information is "INFORMATION PROCESS" in the individual set value DB 613. The members stored in the information-process-set-value DB 860 is managed in the same system as the members managed in the master data 601.

When a set value is changed in the server 110 or the multifunctional peripheral device, at least a key identifier and set values (current value and initial value) among the data stored in the information-process-set-value DB 860 shown in FIG. 16 are reported from the server 110 or the multifunctional peripheral device, and the set value enters a synchronizing state. It should be noted that the DB 860 is stored in the HDD 404 of the first controller 301.

A printer-set-data management module 840 manages a printer-set-value DB 870.

FIG. 17 is a view showing an example of data stored in the printer-set-value DB 870 shown in FIG. 15.

The members stored in the printer-set-value DB 870 is the same as the members in the above-mentioned information-process-set-value DB 860. However, the printer-set-value DB 870 consists of the set values of which the management controller information is "PRINTER". The printer-set-data management module 840 is stored in the RAM 503A, ROM 502A, or NVRAM 504A of the second controller 302, and is performed by the CPU 501A. Moreover, the printer-set-value DB 870 is stored in the NVRAM 504A of the second controller 302.

A scanner-set-data management module 850 manages a scanner-set-value DB 880.

FIG. 18 is a view showing an example of data stored in the scanner-set-value DB 880 shown in FIG. 15.

The members stored in the scanner-set-value DB 880 is the same as the members in the above-mentioned information-process-set-value DB 860 and printer-set-value DB 870. However, the scanner-set-value DB 880 consists of the set values of which the management controller information is "SCANNER". The scanner-set-data management module 850 is stored in the RAM 503B, ROM 502B, or NVRAM 504B of the third controller 303, and is performed by the CPU 501B. Moreover, the scanner-set-value DB 880 is stored in the NVRAM 504B of the third controller 303.

In the following description, the information-process-set-value DB 860, printer-set-value DB 870, and scanner-set-value DB 880 may be generically called a "controller set value DB". Moreover, the printer-set-data management module 840 and scanner-set-data management module 850 may be generically called "device-set-data management modules". Furthermore, the first controller 301, second controller 302, and third controller 303 may be generically called "controllers".

The communication control module 820 is provided with a plurality of functional blocks, and controls communication through the network unit 405. The communication control module 820 has a control module 821, timing management module 822, communication processing module 823, and last synchronization time DB 824. The control module 821 controls a set-value synchronization process with the server 110. The timing management module 822 manages a synchronization timing of setting data (set values). The communication processing module 823 performs a communications process through the network unit 405.

A power supply management module 830 manages power supply states of the controllers of the multifunctional peripheral device.

FIG. 19 is a view showing examples of the power supply states of the controllers managed by the power supply management module 830 shown in FIG. 15.

The power supply management module 830 manages whether a power supply state of a controller is an "ENERGIZED" state or "NON-ENERGIZED" state. In the example shown in FIG. 19, the first controller 301 (information process) is in the energized state at the present time. Moreover, the second controller 302 (printer) and the third controller 303 (scanner) are in the non-energized state (sleep state).

When the communication control module 820 obtains the set-value update information from the server 110, the set-data management module 810 receives the set-value update information concerned from the communication control module 820. Then, the set-data management module 810 reflects the set-value update information to the information-process-set-value DB 860. Furthermore, the set-data management module 810 requests the printer-set-data management module 840 and scanner-set-data management module 850 to reflect the set-value update information to the DBs 870 and 880.

Moreover, when a set value is updated in one of the set value DBs 860, 870, and 880, the set-data management module 810 requests the communication control module 820 to reflect the set-value update information to the master data 601 managed by the server 110.

The communication control module 820 controls a set-value synchronization communication with the server 110. The timing management module 822 determines a timing at which the set-value update information in the master data 601 is obtained from the server 110 periodically (i.e., every time period defined beforehand). Receiving the notification from the timing management module 822, the control module 821 instructs the communication processing module 823 to perform the communication process with the server 110.

In this case, the control module 821 obtains the power supply states of the multifunctional peripheral device from the power supply management module 830 and obtains the last synchronization time from the last synchronization time DB 824. Then, the control module 821 changes the communication process instructed to the communication processing module 823 on the basis of the power supply states and the last synchronization time. Furthermore, the control module 821 receives the set-value update information in the master data 601 that the communication processing module 823 obtained from the server 110, and requests the set-data management module 810 to reflect the set-value update information.

The last synchronization time saved in the last synchronization time DB 824 is used to manage the time when the multifunctional peripheral device finally obtained the set-value update information from the server 110 and reflected the set-value update information to the set value DBs.

FIG. 20 is a view showing an example of data stored in the last synchronization time DB 824 shown in FIG. 15.

As illustrated, the last synchronization times of the set value DBs 860, 870, and 880 are shown. It should be noted that the last synchronization time DB 824 is stored in the HDD 404 of the first controller 301. Moreover, the set-value synchronization process is performed when the network unit 207 of the server 110 communicates with the network unit 405 of the multifunctional peripheral device through the network 100.

Receiving the request from the set-data management module 810, the printer-set-data management module 840 reflects the set-value update information received from the server 110 to the printer-set-value DB 870. Moreover, when a set value in the printer-set-value DB 870 is changed, the printer-set-data management module 840 requests the set-data management module 810 to perform a reflection process to reflect the set-value update information to the server 110.

Receiving the request from the set-data management module 810, the scanner-set-data management module 850 reflects the set-value update information received from the server 110 to the scanner-set-value DB 880. Moreover, when a set value in the scanner-set-value DB 880 is changed, the scanner-set-data management module 850 requests the set-data management module 810 to perform the reflection process to reflect the set-value update information to the server 110.

Figure 21:
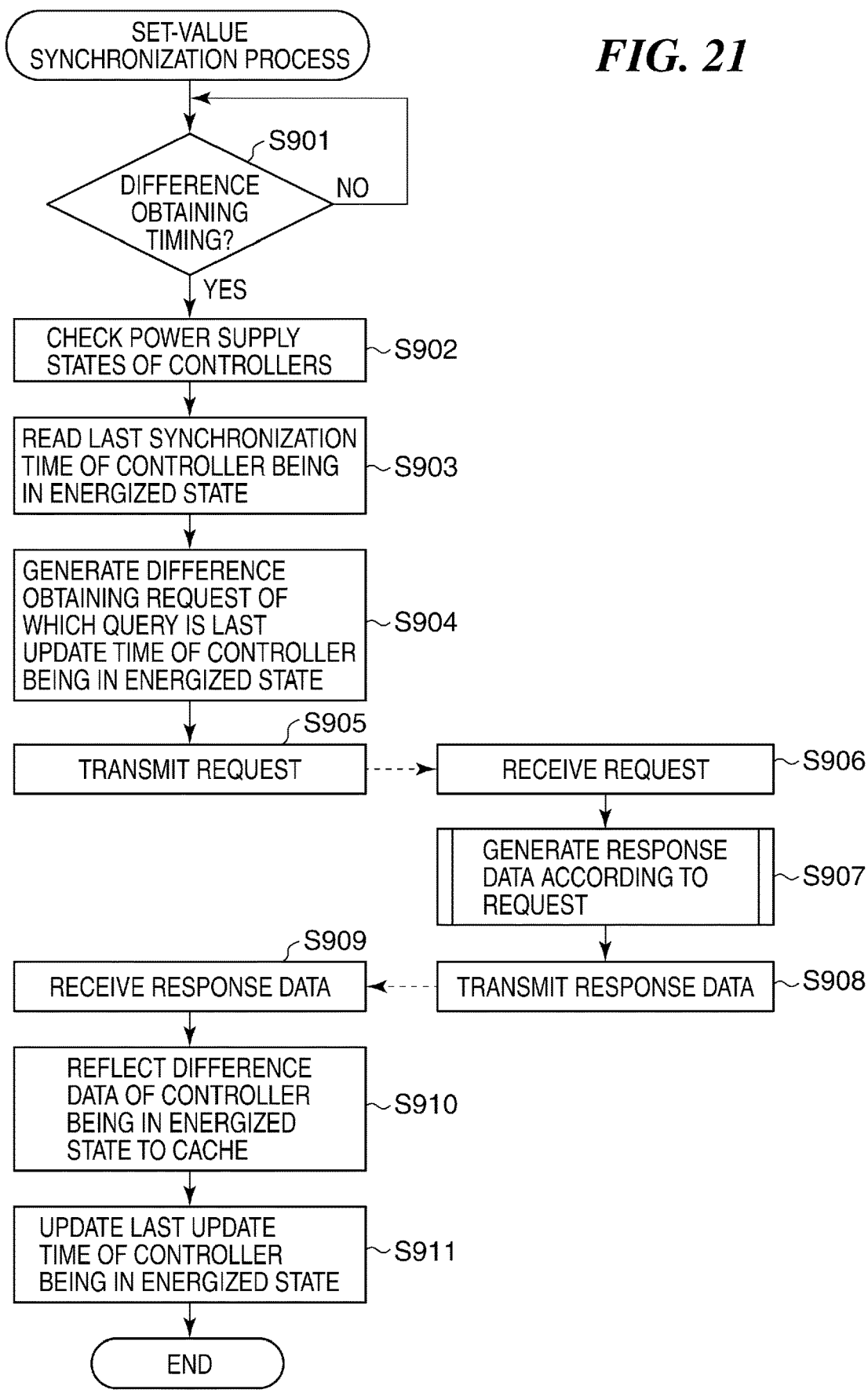
FIG. 21 is a flowchart for describing a set-value synchronization process performed in the multifunctional peripheral device shown in FIG. 3.

FIG. 21 is a flowchart for describing the set-value synchronization process performed in the multifunctional peripheral device shown in FIG. 3.

In the illustrated flowchart, the set-value update information in the master data 601 is obtained from the server 110, and is reflected to the set value DBs. Then, this process is performed by the CPUs 201, 401, 501A, and 501B.

When the set-value synchronization process is started, the timing management module 822 determines whether a timing (difference obtaining timing) at which the set-value update information should be obtained from the server 110 has come (step S901). When determining the timing, the timing management module 822 determines whether a predetermined time period has elapsed from the time at which the set-value update information was obtained last time. When the predetermined time period has elapsed, it is determined that the difference obtaining timing has come.

As a result of the determination, when determining that it is not the timing at which the set-value update information should be obtained (NO in the step S901), the timing management module 822 waits. On the other hand, when determining that it is the timing at which the set-value update information should be obtained (YES in the step S901), the timing management module 822 notifies the control module 821 of the result.

The control module 821 obtains the current power supply states of the controllers from the power supply management module 830, and checks the power supply states (step S902). In this place, the power supply states shall be as shown in FIG. 19.

Thus, it is determined whether the image output device (printer) is in the energized state on the basis of whether the second controller 302 that controls the image output device is in the energized state. Moreover, it is determined whether the image input device (scanner) is in the energized state on the basis of whether the third controller that controls the image input device is in the energized state.

Subsequently, the control module 821 reads a last synchronization time of a controller being in the energized state among the controllers of which the power supply states were obtained in the step S902 from the last-synchronization-time DB 824 (step S903). In this place, the last update times of the controllers shall be as shown in FIG. 20. Accordingly, the control module 821 reads the last update time "2013/6/18/17:13" of the first controller 301 (information process) in the process in the step S903.

Next, the control module 821 notifies the communication processing module 823 of the last update time of the controller being in the energized state. Furthermore, the control module 821 instructs the communication processing module 823 to obtain the set-value update information about these controllers from the server 110.

Next, the communication processing module 823 generates a difference obtaining request (requested data) for obtaining the set-value update information about the controller being in the energized state on the basis of the last update time of the controller from the server 110 (step S904). Then, the information processing apparatus 823 transmits the request data concerned to the server 110 (step S905).

It should be noted that the request data is transmitted to the server 110 in the request line format of the following HTTP communication, for example. GET http://server_addr/getLastModified?it=201306181713

This request data requests to obtain a set value updated after "2013/6/18/17:13" among the set values for the first controller 301 from the server 110.

Subsequently, the communication processing module 722 of the server application 700 receives the request data in the server 110 (step S906). Then, the communication processing module 722 notifies the control module 721 of the request data. The control module 721 notifies the set-data management module 710 of a combination of the controller of which the set-value-update information is requested and its last synchronization time among the request data, and requests to obtain the set-value update information.

Next, the set-data management module 710 generates the set-value update information (update data) corresponding to the request condition, and notifies the control module 721 of the result. Receiving the set-value update information, the control module 721 generates reply data (response data) to the request data from the multifunctional peripheral device on the basis of the set-value update information (step S907). The control module 721 instructs the communication processing module 722 to transmit the response data. Then, the communication processing module 722 transmits the response data to the multifunctional peripheral device (step S908).

Subsequently, the communication processing module 823 receives the response data in the client application 800 (step S909). Then, the communication control module 823 notifies the control module 821 of the response data.

The control module 821 requests the set-data management module 810 to reflect the set-value update information to the set value DBs. Then, the set-data management module 810 extracts the setting value included in the information-process-set-value DB 860 from among the set values included in the set-value update information. That is, the set value of which the management controller is "INFORMATION PROCESS" is extracted. Then, the set-data management module 810 reflects the information (data) extracted to the information-process-set-value DB 860 (step S910).

Next, the set-data management module 810 requests the printer-set-data management module 840 to perform the reflection process to reflect the set value of which the management controller is "PRINTER". Moreover, the set-data management module 810 requests the scanner-set-data management module 850 to perform the reflection process to reflect the set value of which the management controller is "SCANNER".

However, since the power supply states of the second controller 302 and third controller 303 obtained in the process in the step S902 show the non-energized state, the set value for the printer and the set value for the scanner are not received in this place. Accordingly, there is no set value of which the management controller is "PRINTER" or "SCANNER". Accordingly, the set-data management module 810 does not request to perform the reflection process to reflect the set-value update information.

When the reflection process is completed, the set-data management module 810 notifies the control module 821 that the process to reflect the set-value update information in the multifunctional peripheral device has been completed.

The control module 821 updates the last synchronization time corresponding to the controller that was determined as being in the energized state in the process in the step S902 in the last-synchronization-time DB 824 with the time entry 2013/09/10/11:28 included in the set-value update information (step S911). Then, the control module 821 finishes the set-value synchronization process.

Figure 22:
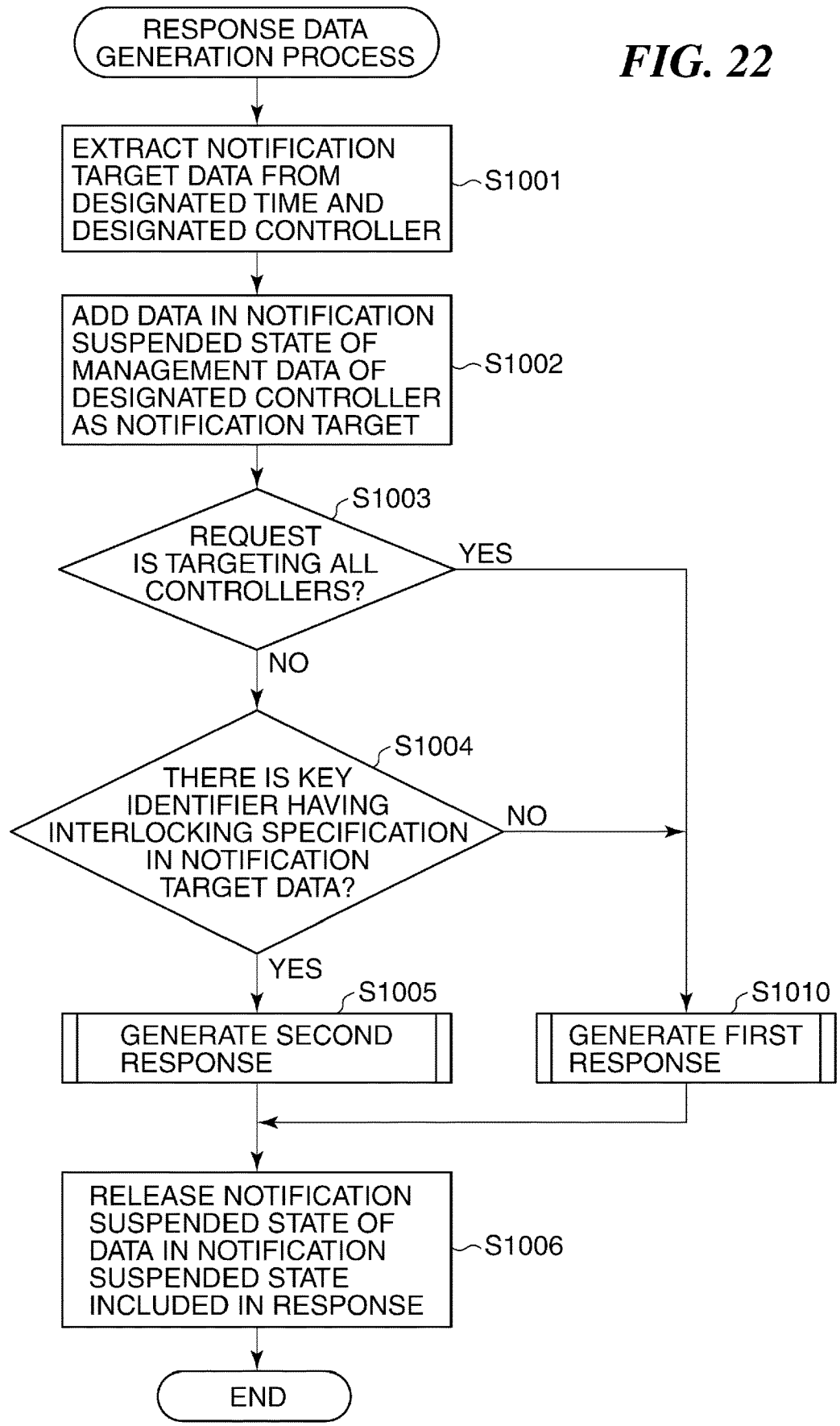
FIG. 22 is a flowchart for describing generation of response data shown in FIG. 21.

FIG. 22 is a flowchart for describing generation of the response data shown in FIG. 21.

When the request is received from the multifunctional peripheral device, the server 110 generates the response data as mentioned above. This request requires the set value updated after the last synchronization time (hereinafter referred to as designated time) about the controller being in the energized state (hereinafter referred to as a designated controller). Receiving the request, the set-data management module 710 extracts a set value updated after the designated time about the designated controller as notification target data from the individual-set-value DB 613 (step S1001).

Subsequently, the set-data management module 710 extracts a set value in the notification suspended state from the individual-set-value DB 613 even if the set value was updated before the designated time, and adds the extracted set value to the above-mentioned notification target data (step S1002). The set-data management module 710 checks whether the request is targeting all the controllers (step S1003).

When all the controllers are targeted (YES in the step S1003), the set-data management module 710 generates a first response in which all the items of the notification target are included in response data (step S1010). On the other hand, when not all the controllers are targeted (NO in the step S1003, i.e., when the request excludes a controller being in the non-energized state), the set-data management module 710 determines whether there is a notification target having an interlocking specification with reference to the information in the specification management DB 610 (step S1004). In this place, the set-data management module 710 obtains a determination result by determining the existence of the interlocking specification.

When there is no notification target having an interlocking specification (NO in the step S1004), the set-data management module 710 assumes that the notification target is a set value used only for a controller being in the energized state even though there is a controller being in the non-energized state. Then, the set-data management module 710 proceeds with the process to step S1010, and generates a first response.

On the other hand, when there is a notification target having an interlocking specification (YES in the step S1004), the set-data management module 710 generates a second response (step S1005). After the process in the step S1005 or S1010, the set-data management module 710 releases the notification suspended state about the set value in the notification suspended state included in the first or second response (step S1006). Then, the set-data management module 710 finishes the response data generation process.

Figure 23:
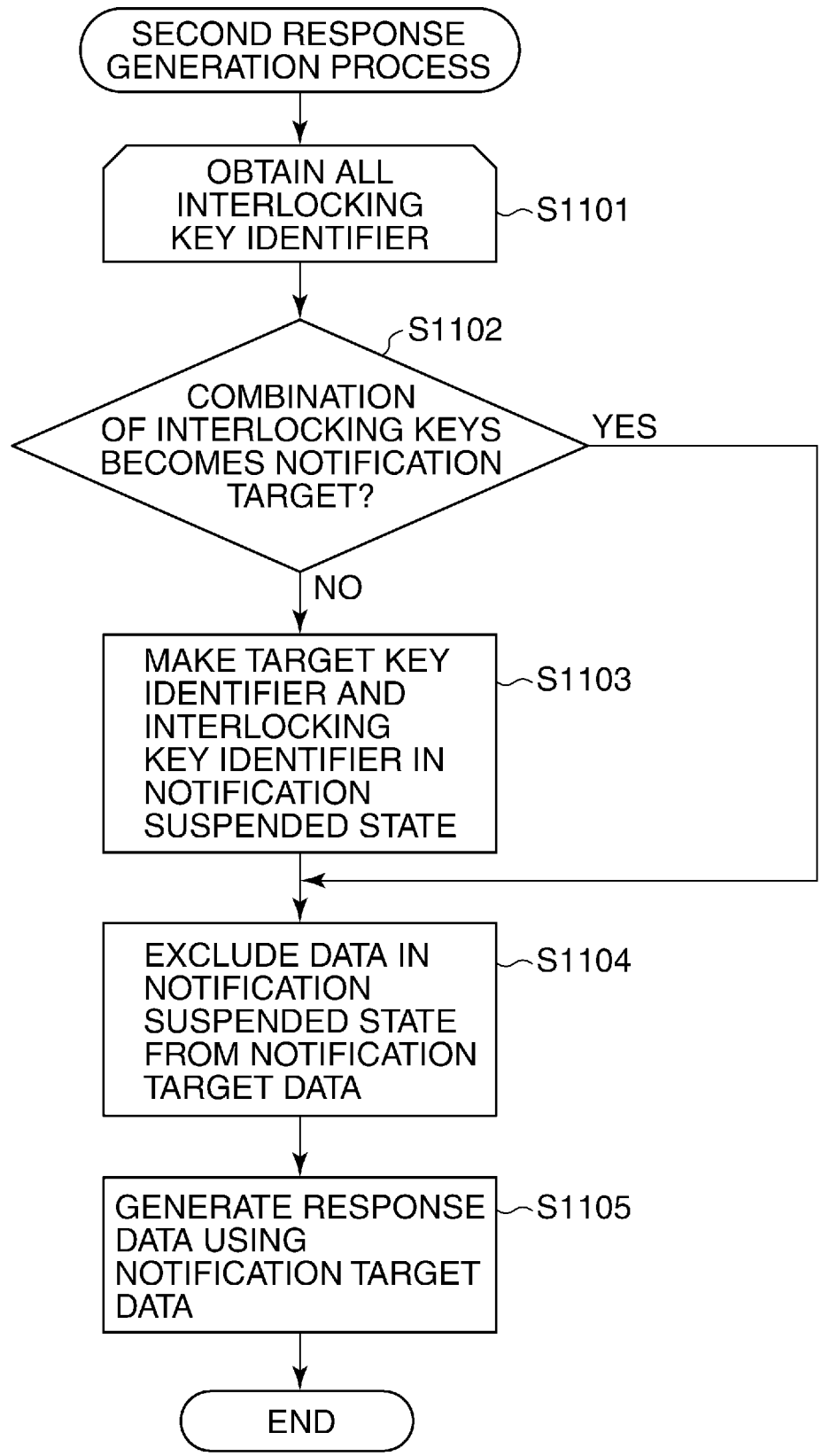
FIG. 23 is a flowchart for describing generation of second response data shown in FIG. 22.

FIG. 23 is a flowchart for describing generation of the second response data shown in FIG. 22.

When generation of the second response is started, the set-data management module 710 obtains the interlocking key identifier with reference to the specification management DB 610 (step S1101). Then, the set-data management module 710 checks whether a combination of interlocking keys (data group having dependency relationship) becomes a notification target for items of the interlocking specification among all the items of the notification target (step S1102).

In the example shown in FIG. 8, the key identifier "device_settings.d002" has dependency relationship (interlocking relationship) with the key identifier "scanner_settings.s001". Accordingly, both these two key identifiers need to become the notification target.

In this case, when the third controller 303 is in the non-energized state, a set value of which the management controller information is "SCANNER" does not become the notification target. Accordingly, the combination of the key identifiers does not become the notification target.

When the combination of the interlocking keys does not become the notification target (NO in the step S1102), the set-data management module 710 adds the flag of the notification suspended state to the key identifiers that interlock in the individual-set-value DB 613 (notification is suspended, step S1103). Thus, after performing the above-mentioned process for all the interlocking key identifiers, the set-data management module 710 excludes the data in the notification suspended state from the notification target data (step S1104). Then, the set-data management module 710 generates response data (second response) using the remaining notification target data (step S1105), and finishes the second response generation process.

When the combination of the interlocking keys is the notification target (YES in the step S1102), the set-data management module 710 proceeds with the process to the step S1104.

Thus, when the request about the controller being in the energized state is received from the multifunctional peripheral device, the response data is generated in consideration of integrity even if the set values interlocking between a plurality of controllers are changed.

FIG. 24 is a view showing an example of the response data generated by the set-data management module shown in FIG. 14.

As shown in FIG. 24, a combination of time at which response data is generated, a key of a target set value, and its value is generated in the XML data format. It should be noted that the data format of the response data is not limited to the XML data format.

As mentioned above, the update information about a device controlled by a controller that is determined as in the energized state is requested from an external device in the first embodiment of the present invention. On the other hand, response data concerning a set value about a controller being in the non-energized state is not requested. That is, it is controlled so as not to obtain the response data concerning the controller being in the non-energized state. Then, the synchronous control is performed while keeping the integrity of the set values interlocking between a plurality of controllers.

Subsequently, an example of an information processing system according to a second embodiment of the present invention will be described. It should be noted that configurations (hardware configurations and software configurations) of a multifunctional peripheral device and a server in the second embodiment are similar to the configurations of the multifunctional peripheral device and the server described in the first embodiment.

Figure 25A:
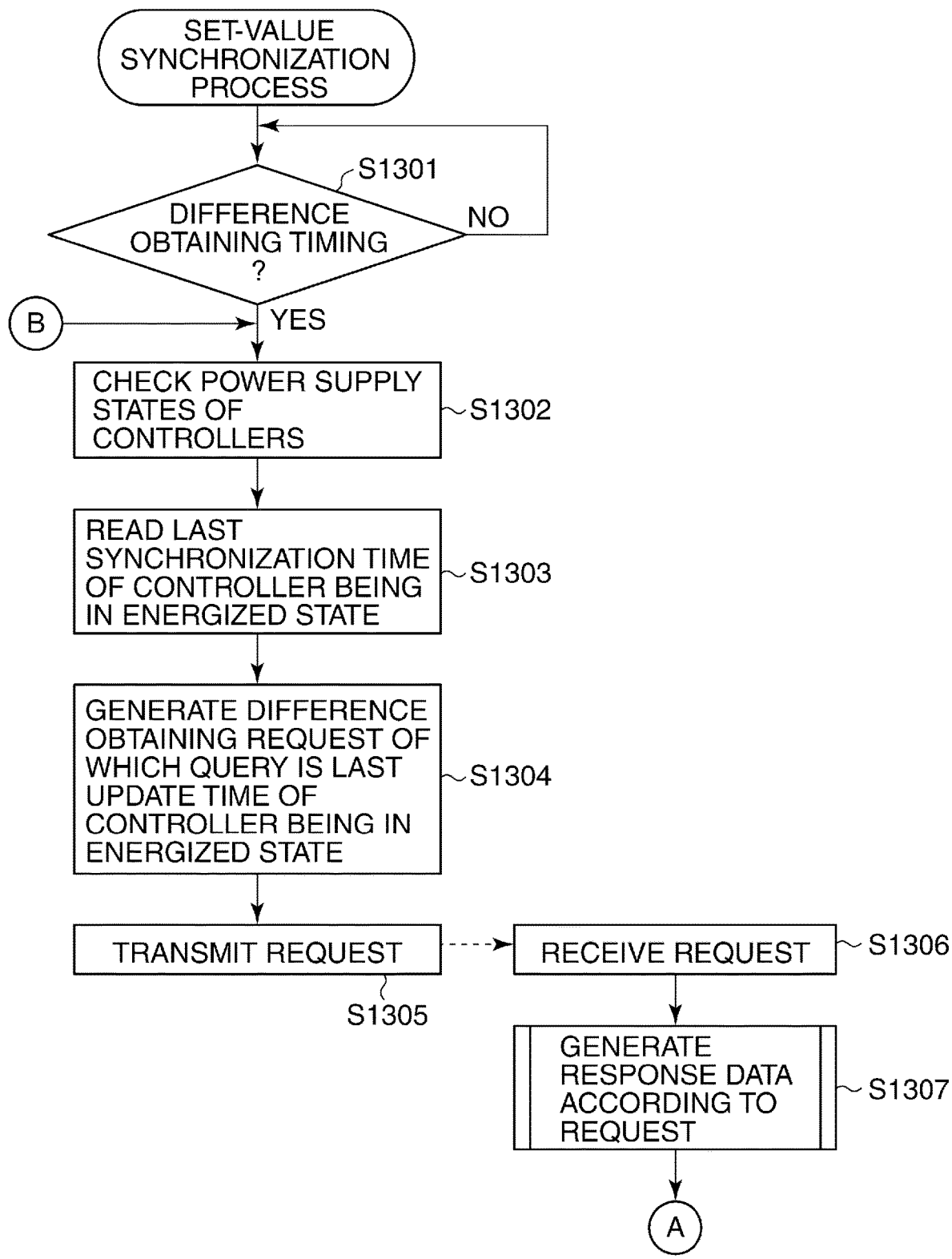
FIG. 25A and FIG. 25B are a flowchart for describing an example of a set-value synchronization process performed in an information processing system according to a second embodiment of the present invention.
Figure 25B:
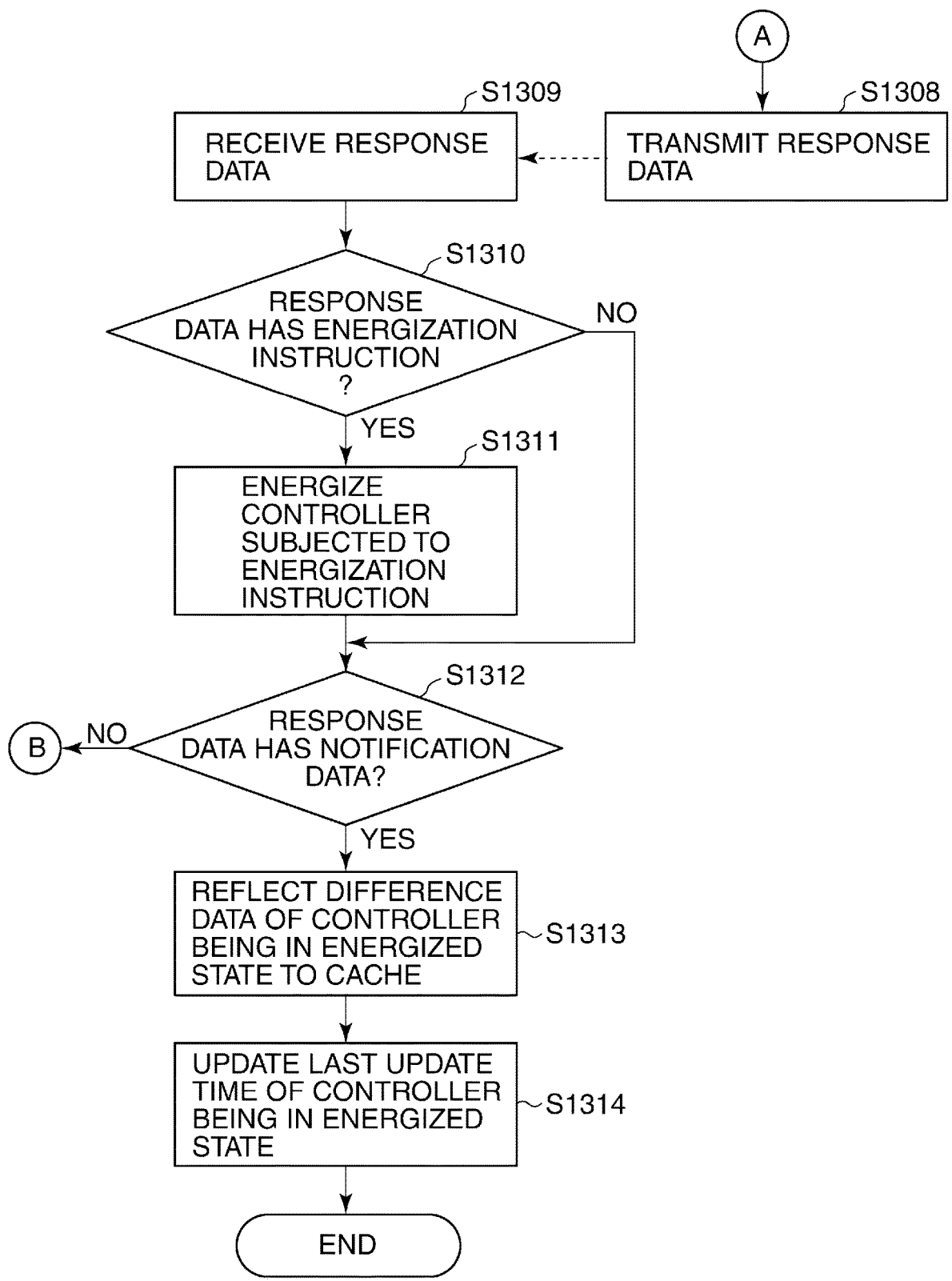

FIG. 25A and FIG. 25B are a flowchart for describing an example of a set-value synchronization process performed in the information processing system according to the second embodiment of the present invention. It should be that processes in steps S1301 through S1306 in FIG. 25A are the same as the processes in the steps S901 through S906 shown in FIG. 21.

In this place, the server 110 shall receive a request of update data (i.e., set values) of only a controller being in the energized state. The set-data management module 710 generates response data corresponding to the request (step S1307). The process in the step S1307 is similar to the response data generation process shown in FIG. 22. However, when there is a key identifier having an interlocking specification (YES in the step S1004), the set-data management module 710 generates a second response data and add an energization instruction to the second response data in the second embodiment.

It should be noted that the set-data management module 710 may generate the second response data with only the energization instruction without taking in the set values (i.e., update data). Furthermore, the set-data management module 701 may make the second response data include the update data of all the controllers and add the energization instruction.

Subsequently, the set-data management module 710 sends the response to the multifunctional peripheral device with the communication control module 720 (step S1308). In the multifunctional peripheral device, the communication processing module 823 receives the response concerned (step S1309). Then, the communication processing module 823 notifies the set-data management module 810 of the response through the control module 821. The set-data management module 810 checks whether the received response data (i.e., set-value update information) has an energization instruction (step S1310).

When there is an energization instruction (YES in the step S1310), the set-data management module 810 controls the power supply management module 830 to energize the instructed controller being in the non-energized state (step S1311). After that, the set-data management module 810 checks whether the received response data has the set data (set values: notification data) that should be reflected (step S1312). When there is no energization instruction (NO in the step S1310), the set-data management module 821 proceeds with the process to the step S1312.

When there is no set data (NO in the step S1312), the set-data management module 810 returns the process to the step S1302 and requests again. On the other hand, when there is set data (YES in the step S1312), the set-data management module 810 proceeds with the process to step S1313. Since the processes in the steps S1313 and S1314 in FIG. 25B are equivalent to the processes in the steps S910 and S911 in FIG. 21, the descriptions are omitted.

Thus, in the second embodiment of the present invention, even when a set value in the interlocked state between a controller being in the energized state and a controller being in the non-energized state is changed, the controller being in the non-energized state enters the energized state. As a result of this, the set value in the interlocked state is updated and synchronized certainly.

As is clear from the above description, the set-data management module 710 and the communication control module 720 function as the determination unit and control unit in the example shown in FIG. 14 and FIG. 15. Moreover, the set-data management module 810, the communication control module 820, and the power supply management module 830 function as the transmission unit.

Although the embodiments of the present invention have been described, the present invention is not limited to the above-mentioned embodiments, the present invention includes various modifications as long as the concept of the invention is not deviated.

Moreover, the functions of the above mentioned embodiments may be achieved as a control method that is executed by an information processing apparatus. Moreover, the functions of the above mentioned embodiments may be achieved as a control program that is executed by a computer with which the information processing apparatus is provided. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-131174, filed Jun. 30, 2015, which is hereby incorporated by reference herein in its entirety.

What is claimed is:

1. An information processing apparatus comprising:
a memory configured to store instructions; and
a processor configured to execute the instructions to perform:
a receiving task that receives, from an image forming apparatus that includes a plurality of devices whose energization states are controllable independently, a request for update information indicating setting information which has been updated in the information processing apparatus, wherein the request is related to a first device of the plurality of devices, the first device being in an energized state in the image forming apparatus;
a determination task that determines that the requested update information related to the first device has a dependency relationship with setting information of a second device of the plurality of devices, the second device being in a non-energized state in the image forming apparatus; and
a control task that, in a case where it is determined that the requested update information has a dependency relationship with the setting information of the second device, identifies setting information included in the requested update information that has the dependency relationship with the setting information of the second device of the plurality of devices, suspends transmission of the identified setting information included in the requested update information that has the dependency relationship with setting information of the second device of the plurality of devices, and transmits setting information included in the requested update information that does not have the dependency relationship with setting information of the second device of the plurality of devices to the image forming apparatus in response to the received request.

2. The information processing apparatus according to claim 1, wherein the control task suspends transmission of the identified setting information included in the requested update information that has the dependency relationship with setting information of the second device of the plurality of devices until the second device that is in the non-energized state enters the energized state.

3. The information processing apparatus according to claim 1, wherein the control task transmits an instruction shifting the second device that is in the non-energized state to the energized state to the image forming apparatus in the case where it is determined that the requested update information has the dependency relationship with the setting information of the second device that is in the non-energized state.

4. The information processing apparatus according to claim 1, wherein the determination task determines that the requested update information has the dependency relationship with the setting information of the second device that is in the non-energized state in a case where an identifier showing that the requested update information has the dependency relationship with the setting information of the second device that is in the non-energized state is attached.

5. The information processing apparatus according to claim 4, wherein the control task identifies the setting information of the first device that has the dependency relationship with the setting information of the second device of the plurality of devices based at least on the attached identifier, suspends transmission of the identified setting information of the first device included in the requested update information that has the dependency relationship with the setting information of the second device while the second device is in the non-energized state, and transmits the setting information of the first device included in the requested update information that has the dependency relationship with the setting information of the second device to both the first device and the second device when the second device enters the energized state.

6. The information processing apparatus according to claim 1, further comprising a table used to manage relationships between the plurality of devices and the setting information,
    wherein the determination task determines whether the requested update information has the dependency relationship with the setting information of the second device that is in the non-energized state with reference to the table.

7. An information processing system comprising:
    an image forming apparatus that includes a plurality of devices whose energization states are controllable independently and a transmission unit configured to transmit a request for update information indicating setting information which has been updated in an information processing apparatus, wherein the request is related to a first device of the plurality of devices, the first device being in an energized state in the image forming apparatus, and perform an information process according to the setting information; and
    an information processing apparatus that sends a response to the request for the update information indicating setting information to the image forming apparatus, the information processing apparatus comprising:
        a memory configured to store instructions; and
        a processor configured to execute the instructions to perform:
            a determination task that determines that the requested update information related to the first device has a dependency relationship with setting information of a second device of the plurality of devices, the second device being in a non-energized state in the image forming apparatus; and
            a control task that, in a case where it is determined that the requested update information has a dependency relationship with the setting information of the second device, identifies setting information included in the requested update information that has the dependency relationship with the setting information of the second device of the plurality of devices, suspends transmission of the identified setting information included in the requested update information that has the dependency relationship with setting information of the second device of the plurality of devices, and transmits setting information included in the requested update information that does not have the dependency relationship with setting information of the second device of the plurality of devices to the image forming apparatus in response to the received request.

8. The information processing system according to claim 7,
    wherein the image forming apparatus includes an image output device, an image input device, and an energization determination unit, and
    wherein the energization determination unit determines whether the image output device is in the energized state based on whether a controller that controls the image output device is in the energized state, and determines whether the image input device is in the energized state based on whether a controller that controls the image input device is in the energized state.

9. The information processing system according to claim 7,
    wherein the image forming apparatus includes an image output device, an image input device, and an energization determination unit,
    wherein the energization determination unit determines whether a first controller that controls the image output device and the image input device is in the energized state, determines whether a second controller that controls the image output device under control of the first controller is in the energized state, and determines whether a third controller that controls the image input device under the control of the first controller is in the energized state, and
    wherein the transmission unit transmits the request for the update information indicating setting information of a device that is controlled by a controller determined as being in the energized state to the information processing apparatus.

10. The information processing system according to claim 7, wherein the image forming apparatus comprises an image processing apparatus that performs an image process according to the setting information, and the information processing apparatus comprises a server connected to the image forming apparatus through a network.

11. A control method for an information processing apparatus, the method comprising:
    a receiving step of receiving, from an image forming apparatus that includes a plurality of devices whose energization states are controllable independently, a request for update information indicating setting information which has been updated in the information processing apparatus, wherein the request is related to a first device of the plurality of devices, the first device being in an energized state in the image forming apparatus;
    a determination step of determining that the requested update information related to the first device has a dependency relationship with setting information of a second device of the plurality of devices, the second device being in a non-energized state in the image forming apparatus; and
    a control step of, in a case where it is determined that the requested update information has a dependency relationship with the setting information of the second device, identifying setting information included in the requested update information that has the dependency relationship with the setting information of the second device of the plurality of devices, suspending transmission of the identified setting information included in the requested update information that has the dependency relationship with setting information of the second device of the plurality of devices, and transmitting setting information included in the requested update information that does not have the dependency relationship with setting information of the second device of the plurality of devices to the image forming apparatus in response to the received request.

12. A non-transitory computer-readable storage medium storing a control program causing a computer to execute a control method for an information processing apparatus, the control method comprising:
    a receiving step of receiving, from an image forming apparatus that includes a plurality of devices whose energization states are controllable independently, a request for update information indicating setting information which has been updated in the information processing apparatus, wherein the request is related to a first device of the plurality of devices, the first device being in an energized state in the image forming apparatus;

a determination step of determining that the requested update information related to the first device has a dependency relationship with setting information of a second device of the plurality of devices, the second device being in a non-energized state in the image forming apparatus; and a control step of, in a case where it is determined that the requested update information has a dependency relationship with the setting information of the second device, identifying setting information included in the requested update information that has the dependency relationship with the setting information of the second device of the plurality of devices, suspending transmission of the identified setting information included in the requested update information that has the dependency relationship with setting information of the second device of the plurality of devices, and transmitting setting information included in the requested update information that does not have the dependency relationship with setting information of the second device of the plurality of devices to the image forming apparatus in response to the received request.

* * * * *